United States Patent
Springer et al.

(10) Patent No.: US 6,335,971 B1
(45) Date of Patent: Jan. 1, 2002

(54) COUNTRY TO COUNTRY CALL INTERCEPT PROCESS

(75) Inventors: Arthur L. Springer, Waterloo, IA (US); Dean Marchand, Brighton, CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/464,785

(22) Filed: Dec. 17, 1999

(51) Int. Cl.[7] ............... H04M 1/66; H04M 11/00; H04M 17/00
(52) U.S. Cl. ............ 379/189; 379/91.02; 379/144; 379/145; 379/196
(58) Field of Search ............................ 379/188, 189, 379/190, 191, 192, 193, 194, 195, 196, 197, 198, 199, 200, 218, 144, 145, 91.01, 91.02, 93.02

(56) References Cited

U.S. PATENT DOCUMENTS

| | | | |
|---|---|---|---|
| 5,345,595 A | * 9/1994 | Johnson et al. | 379/189 X |
| 5,463,681 A | * 10/1995 | Vaios et al. | 379/145 X |
| 5,566,234 A | * 10/1996 | Reed et al. | 379/145 X |
| 5,602,906 A | 2/1997 | Phelps | |
| 5,638,431 A | 6/1997 | Everett et al. | |
| 5,768,345 A | 6/1998 | Lange et al. | |
| 5,805,686 A | 9/1998 | Moller et al. | |
| 5,809,125 A | 9/1998 | Gammino | |
| 5,867,566 A | 2/1999 | Hogan et al. | |
| 5,875,236 A | 2/1999 | Jankowitz et al. | |
| 5,907,602 A | 5/1999 | Peel et al. | |
| 5,970,405 A | 10/1999 | Kaplan et al. | |
| 5,988,497 A | 11/1999 | Wallace | |
| 6,163,604 A | 12/2000 | Baulier et al. | |

* cited by examiner

*Primary Examiner*—Harry S. Hong

(57) ABSTRACT

A call intercept process (CIP) for calling card calls originating from an international country and terminating at an international high fraud country. When a call is placed via a calling card and terminates to a high fraud terminating location, the call is first screened against a database to determine if the termination is in fact, a high fraud country. Regardless of whether this screening is implemented, the call is routed to a first level operator in order to verify the billing account information of the caller as an authorized user. This verification is based on customer and business name, address, zip code, and phone number. If the caller passes verification, a CIP process automatically overrides the calling card from any future Intercepts. If caller fails account verification, the a CIP process automatically places the card in a 'LOCKED STATUS MODE' which mode indicates that any additional calls based on that card be intercepted regardless of termination. At any time the caller passes verification, the card is lifted and placed in an override process via the CIP process. Pass and failed alerts are generated and passed to a fraud system, in real time, to allow for notification of outcome to all fraud analysts. An additional process enables call intercept failures at a first level operator to fail to a second level operator which allows for further verification and research on customer identity and account to take place.

10 Claims, 3 Drawing Sheets

COUNTRY TO COUNTRY CALL INTERCEPT PROCESS

BACKGROUND OF THE INVENTION

1. Field of the Invention

The present invention relates to the field of telecommunications, and, particularly, to a call-intercept system and method implemented for long distance telephone systems that verifies call identities in order to prevent fraudulent calling card usage.

2. Description of the Prior Art

The telecommunication industry has estimated fraud losses are costing telecommunication service providers five (5) billion dollars per year. Particularly, telecommunication fraud losses are attributed to lost, stolen, or compromised portable calling card products, e.g., in highly populated areas. Calling card products may be compromised in various ways, for example, via social engineering, "shoulder surfing", etc., whereby a perpetrator obtains a physical calling card or calling card number belonging to another. The final result for the perpetrator is to obtain a calling card product in order to place a call to desired location or termination, whether domestic or international.

Residential customers of large telecommunication service providers, e.g., MCI WorldCom, are typically the prey for these types of fraud, and, industry studies have determined that the fraud losses will only increase in the future.

While service providers may place controls within their networks to limit or prevent calls from a specific origination in the United States to a specific international country terminations for outbound international calls, as well as limit or prevent calls from specific international country originations to a specific domestic termination in the United States for inbound international calls, the fraud pattern migrates to other avenues that have less network controls. Thus, fraud still persists in the form of compromised calling card calls that originate from a specific country and terminate to a specific international location. This is done by circumventing the blocks placed on outbound domestic origination to an international termination calls, and inbound international origination to a domestic termination calls.

It would be highly desirable to provide a system for intercepting first time callers terminating a call to a predefined international location from a specific international origination in order to verify the identity of the caller and control fraudulent calling card usage.

SUMMARY OF THE INVENTION

The present invention is directed to a call intercept process (CIP) that functions to intercept callers placing compromised calling card calls for a first time from international locations to predefined high fraud countries terminations, in order to verify the identity of the caller. In operation, a perpetrator who has obtained a calling card product, will have only the physical calling card or the calling card number itself. When the perpetrator attempts to terminate a calling card call to a predefined international location, the calling card call will default to an operator who will ask for the name and account information as it appears on the calling card owner's billing account. The operator will fail the call if the perpetrator disconnects the call or is unable to provide correct name and address billing information as it appears on the account.

Thus, the system of the invention provides the ability to intercept and verify account information with first time calling card callers placing calling card calls from an international origination to a specific international termination. If the caller fails or hangs up, the card is placed in a "locked status" mode and will be intercepted regardless of the termination location until such time the caller passes an account verification requirement. Once the caller passes, the CIP process places the card in a database and the card is over-ridden from customer interruption with intercept on future calls.

Advantageously, passed and failed call intercept calls may then generate alarms for monitoring by a fraud control system. The fraud control system will review the alarms to determine if actions are warranted to block the calling card.

DETAILED DESCRIPTION OF THE PREFERRED EMBODIMENTS

Call intercept is the process of intercepting callers, calling for the first time from international locations to predefined high fraud international terminations, in order to verify the identity of the caller.

Figure 1:
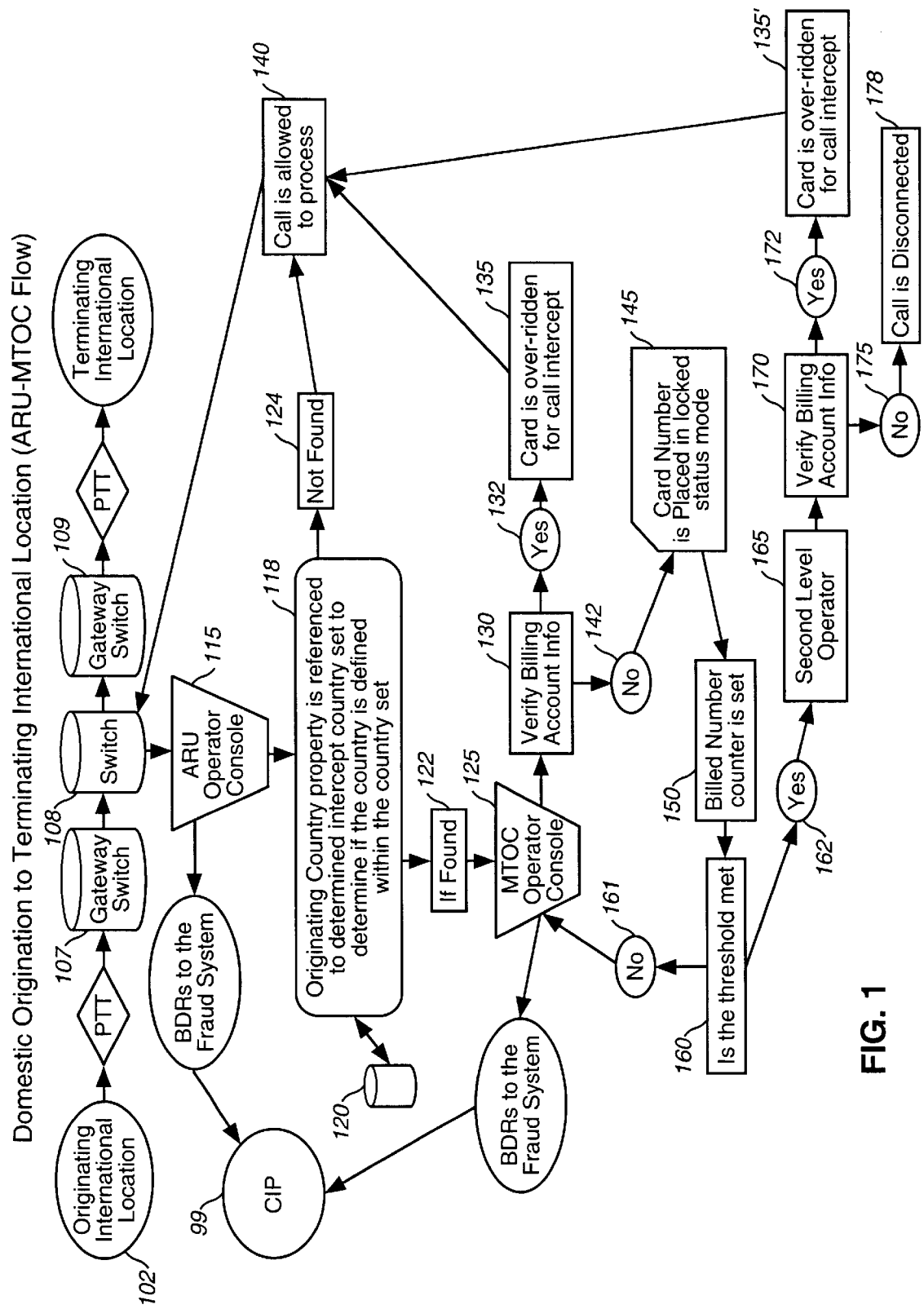
FIG. 1 illustrates a telecommunication system implementing the call intercept process for calls originating from international locations to domestic terminations according to a first embodiment of the invention.

FIG. 1 illustrates the inventive system 100 implementing the call intercept process according to a first embodiment of the invention. In this first embodiment, the caller will dial a calling card access number from an originating international location 102. The call is routed over that country's postal, telegraph, and telephone (PTT) organization which is usually a governmental department functioning as the nation's common carrier providing nationalized telephone and telegraph services, and, additionally, through a gateway switch 107 where the call is received at a telecommunications switch 108 where it is directed to an automated response unit 115. The caller is then prompted to input a calling card and terminating number by the Automated Response Unit (ARU) 115, which is also referred to as the Automated Operator Console. At block 118, the ARU will reference the originating country location to determine the country set. The country code of the terminating number is additionally referenced against a Call Intercept Country Set database table 120. Preferably, the Call Intercept Country Set database table 120 comprises a list that includes combinations of country code origination numbers to country code termination numbers where calling card callers may frequently attempt to call. If the terminating country code is not found in the Call Intercept Country table at block 124, the call is allowed to process at block 140 where it is routed via switch 108 through a gateway switch 109 to the PTT for termination at the terminating international location. If the terminating country code is found in the Call Intercept Country Set database table 120, as indicated at block 122, the call is defaulted from the ARU to a Manual Transfer Operator Console (MTOC) 125, which is also referred to as the Manual Operator Console.

As indicated at block 130, FIG. 1, the MTOC operator will then prompt the caller for the correct billing account information including the customer and/or business name, address, zip code, and phone number as it appears on the billing account. If the caller provides correct information at 132, the card is over-ridden for call intercept by the Call Intercept Process (CIP) at block 135, and the call is allowed to process, as indicated at step 140. That is, an 'Override' flag is associated with that calling card number to prevent an interception. Preferably, if the caller passes verification, a detail record is cut and fed to a mainframe CIP process 99 that automatically overrides the calling card from any future intercepts. This detail record is populated uniquely to allow for the fraud system to alarm the call with a 'Caller Pass Verification alert'.

If the caller provides incorrect name and address or disconnects the call at block 142, the call is denied via the CIP process and the card is placed in Intercept-Locked status mode as indicated at 145. That is, an 'Intercept-Locked' flag is associated with that calling card number so that future attempts made using that calling card will be defaulted to an operator. Preferably, if the caller fails account verification, a detail record is cut and passed to the CIP mainframe process 99 where the card is automatically placed in a 'LOCKED STATUS MODE' which enables any additional calls to be intercepted based on the card regardless of the terminating location. Thus, the next time the calling card number is used, regardless of the terminating location, the caller will be defaulted to a MTOC, where the operator will attempt to verify the calling card owner's name and address. It should be understood that a unique database (not shown) may be implemented for this intercept process based on the World Phone access property records.

As indicated at block 150 in FIG. 1, a billing number counter is set, i.e., incremented, to track the number of call card attempts using that calling card. If subsequent calling card attempts fail a predefined number of times at the MTOC, as indicated at steps 160, 162, the caller is then transferred to a second level operator/customer service center, as shown at block 165. Preferably, the calling call failure threshold is set at five (times) but it is understood that the threshold is configurable. If the calling call failure threshold is not met at step 161, the call is returned to the MTOC which generates the billing data record indicating the Intercept-Locked status mode for the database. Furthermore, the card number will remain in the BNS database assigned the Intercept-Locked status mode.

At block 170, after transference of the call to the second level operator, the operator will then attempt to verify the identity of the caller, e.g., billing account information pertaining to the calling card. At block 172, if the caller provides the correct account information, the card is over-ridden for call intercept through the CIP process logic at 135', and the call is allowed to complete. Thus, the status flag associated with the calling card number is assigned the 'Override' flag to prevent a future interception. If the caller provides incorrect name and address at 175 or disconnects the call, the card number will remain in the Intercept-Locked status mode, and the call is terminated at block 178.

Figure 2:
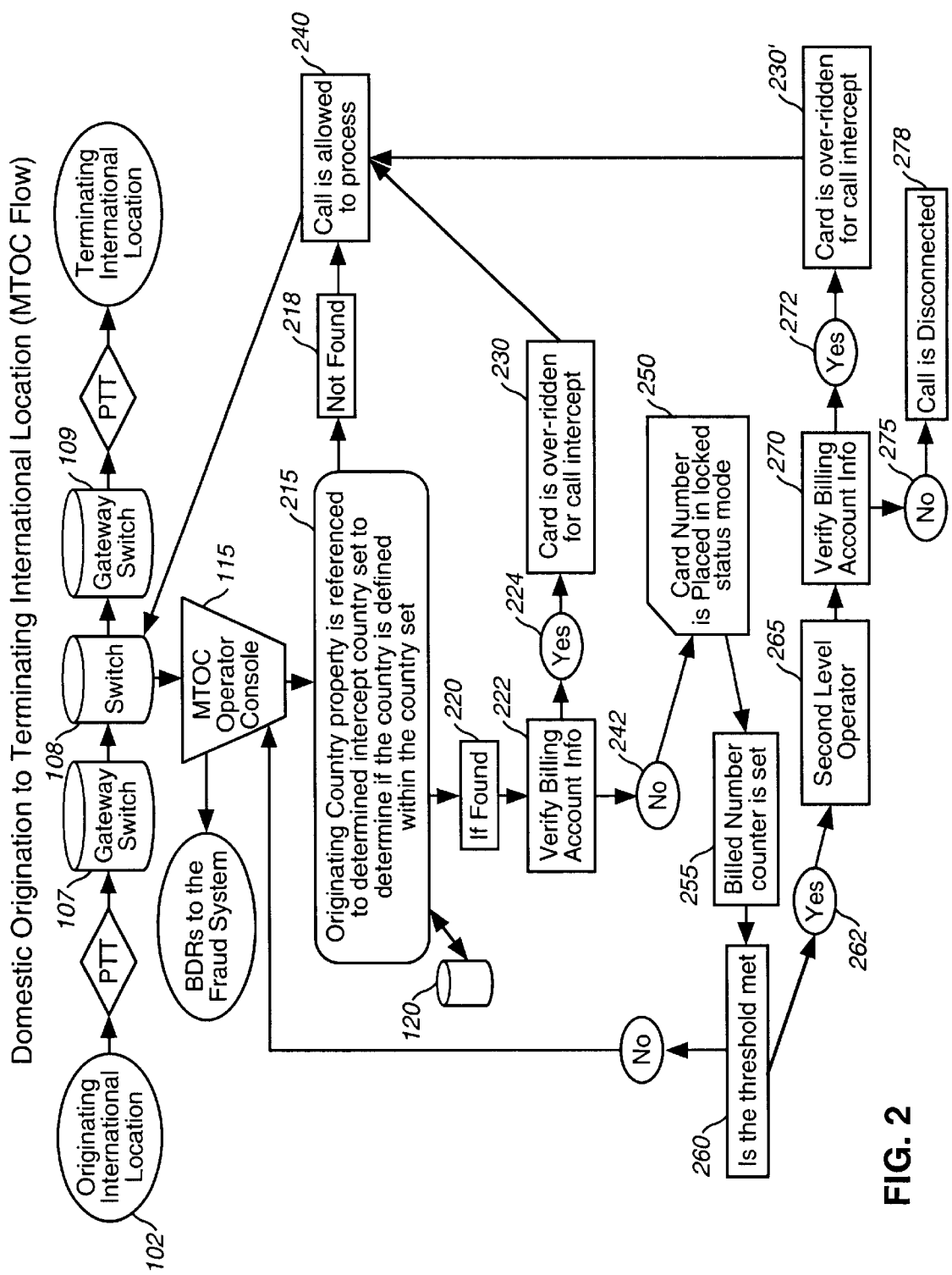
FIG. 2 illustrates a telecommunication system implementing the call intercept process for calls originating from international locations to domestic terminations according to a second embodiment of the invention.

As shown in the process flow diagram of FIG. 2, a first calling card call attempt may first be routed to an MTOC 115 via the switch 108, bypassing the ARU level of screening. The MTOC operator will prompt the caller for calling card and desired terminating number at block 215. At block 218, the MTOC console will then reference the originating country property to determine the country set. The country code of the terminating international location is also referenced against the Call Intercept Country Set database table. If the originating country code is not found in the Call Intercept Country Set database table at block 218, the call is allowed to process as indicated at block 240 and is routed via terminating switch 108 to the international termination. If the originating country and terminating country set combination is found at block 220 in the Call Intercept Country Set Database table 120, the MTOC operator will prompt the caller for correct name and address as it appears on the billing account at block 222.

If the caller provides correct information at block 224, the card is over-ridden for call intercept using the CIP logic at 230 and the call is allowed to process at 240 where it is routed to the international terminating location via gateway switch 109. Additionally, the calling card number is assigned the 'Override' status. If the caller provides incorrect name and address or disconnects the call at block 242, the call is denied and the card is placed in the Intercept-Locked status mode via the CIP at block 250. That is, the calling card number is assigned the 'Intercept-Locked' flag which indicates that further verification for subsequent calls made using that calling card number is necessary. Thus, the next time the calling card number is used, regardless of the terminating location, the MTOC operator will attempt to verify name and address.

Then, as indicated at block 255, a billing number counter is incremented for tracking the number of calling card attempts using that calling card. If the caller fails a pre-defined number of times, e.g., five (5) times, at the MTOC, as indicated at blocks 260, 262, the caller is then transferred to a second level operator, as indicated at block 265, where a 'Transfer to $_2$nd level' flag is set. The second level operator will then attempt to verify the identity of the caller, i.e., verify billing account information pertaining to the calling card, as indicated at block 270. At block 272, if the caller provides the correct account information, the card is over-ridden for call intercept at 230' and the call is allowed to process (240). If the caller provides incorrect name and address at 275 or disconnects the call at 278, the card number will stay in Intercept-Locked status mode.

It is understood that a CIP Call Intercept process 99 is implemented to set the calling card in the different modes for Call Intercept. Particularly, as shown in FIGS. 1 and 2, the Call Intercept Process 99 is a mainframe program that, in real-time receives data feeds, e.g., in the form of call detail or billing detail records, from the operator ARU 115 and MTOC 125 consoles. The data received from these records are populated with the unique 'Override' 'Intercept-locked' and 'Transfer to $_2$nd level' flag values set to allow the CIP program to determine how to treat the calling card based on the outcome of the intercepted call. A list of the types of conditions that may occur at the operator platform, that result in the setting of the unique flags in the call record, is now provided. It is understood that, based on these flags, Call Intercept will set the calling card accordingly for treatment into the Billed Number Screening (BNS) database 120.

Figure 3:
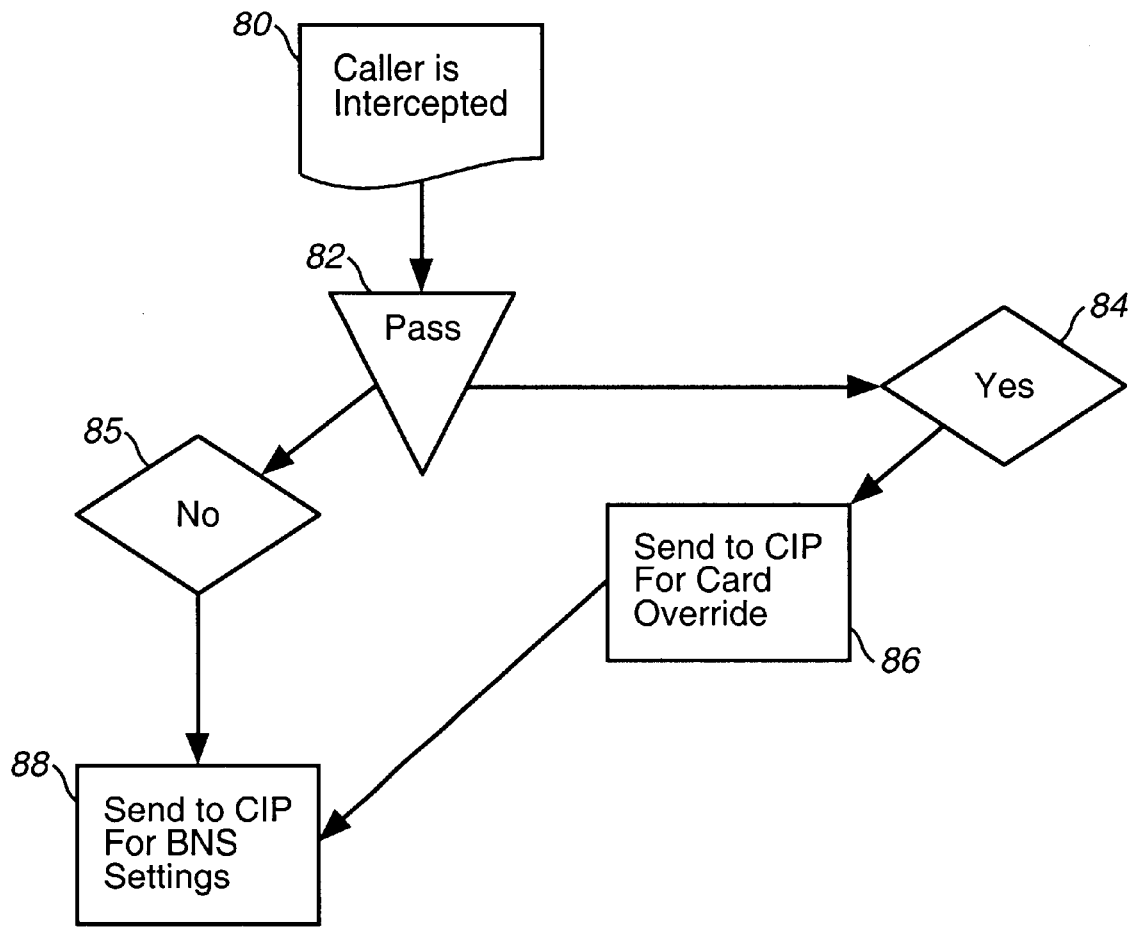
FIG. 3 is a flow diagram depicting the call intercept process mainframe program.

Particularly, as shown in the mainframe CIP process 80 of FIG. 3, at the first call intercept phase 82 initiated at the time a first calling card call is made, if the caller passed account verification at step 84, the CIP program 99 will set the flag on the card to 'Override' at step 86 and place the calling card in the BNS (Billed Number Screening) database 120 as indicated at step 88. This will allow any future calls to ignore this call from intercept treatment via the operator sites. If, at step 85, the caller fails account verification on first call intercept, or even disconnects before entering any information, the CIP program 99 will place the caller in the 'Locked Status Mode' and update the call record in the BNS database with this flag setting (step 86). Any additional calls that take place on the card having this associated status, regardless of termination, will be intercepted.

The CIP program has a configurable counter that allows the callers to be routed to another operator group if the caller continues to fail call intercept over time. Once the counter meets or exceeds the pre-set threshold, the CIP program will place the card in BNS with a 'Transfer to $_2$nd Level' flag set. All additional calls will be routed to the second level operator/customer service operator group regardless of where the caller dialed to terminate.

In each of the above cases, at anytime the caller passed account information, the caller is overridden from future intercepts.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for detecting fraudulent calling card calls, said system comprising:

a switch device for receiving a calling card call placed from an originating international location and capable of routing said calling card call to an international termination;

a device for automatically comparing a country code associated with said originating location and the international termination number against a database comprising combinations of country codes and termination numbers predefined as being high fraud risk;

a device for routing the calling card call to a first level operator if a match against said database is found, said first level operator for verifying billing account information corresponding to said calling card;

a device for terminating said calling card call when said billing information is not verified, wherein a subsequent calling card call from the originating international location will result in default routing of said subsequent calling card call to the first level operator, said calling card call being enabled for processing upon successful verification of billing account information, and terminated otherwise; and means for limiting the subsequent calling card call from the originating international location to a domestic location upon failure of verification of billing account information, said system further including device for routing said calling card call to a second level operator for verifying identity of the caller after a pre-determined number of calling card call attempts.

2. The system as claimed in claim 1, wherein said terminating device places said calling card in a locked intercept mode.

3. The system as claimed in claim 1, wherein said second level operator performs one of: terminating said calling card call when said caller identity is not verified, and processing said calling card call upon successful verification of caller identity.

4. The system as claimed in claim 2, wherein said calling card call is enabled by removing said calling card from said locked intercept mode.

5. A method for detecting fraudulent calling card calls, said method comprising:

a) receiving a calling card call placed from an originating international location at a switch capable of routing a call to an international termination;

b) routing the calling card call to a first level operator for verifying billing account information corresponding to said calling card, said first level operator performing one of: processing said calling card call upon successful verification of billing account information, and terminating said call otherwise;

c) limiting a subsequent calling card call from the originating international location to a domestic location upon failure of verification of billing account information; and d) routing said subsequent calling card call to a second level operator for verifying identity of the caller after a pre-determined number of calling card calls.

6. The method as claimed in claim 5, further comprising automatically comparing a country code associated with said originating location and the domestic termination number against a database comprising combinations of country codes and termination numbers predefined as being high fraud risk, said calling card call being routed to said first level operator if a match against said database is found.

7. The method as claimed in claim 5, wherein said step of terminating comprises placing said calling card in a locked intercept mode.

8. The method as claimed in claim 7, further comprising removing said calling card from said locked intercept mode.

9. A hierarchical method for detecting fraudulent calling card calls, said method comprising:

a) receiving a calling card call placed from an originating international location to a switch for routing a calling card call to an international termination;

b) providing first level of calling card fraud detection by automatically comparing a country code associated with said originating location and the international termination number against a database comprising combinations of country codes and termination numbers predefined as being high fraud risk;

c) providing second level of calling card fraud detection by routing the calling card call to a first level operator if a match against said database is found and processing said calling card call otherwise, said first level operator for verifying billing account information corresponding to said calling card and performing one of: terminating said calling card call when said billing information is not verified, and processing said calling card call upon successful verification of billing account information; and d) upon each of a predefined number of subsequent calling card calls placed from the international origination, automatically routing said calling card calls to the first level operator for verifying billing account information corresponding to said calling card, and processing said calling card call upon successful verification of billing account information, and terminating said calling card call otherwise; and e) selectively routing said calling card call to a second level operator for verifying identity of the caller, said second level operator performing one of: terminating said calling card call when said caller identity is not verified, and processing said calling card call upon successful verification of caller identity.

10. The method as claimed in claim 9, further comprising placing said calling card in a locked intercept mode.

* * * * *